Aug. 8, 1933.  A. M. HARKNESS  1,921,296

FILTER

Filed Sept. 22, 1932

INVENTOR
Andrew M. Harkness
BY
ATTORNEY

Patented Aug. 8, 1933

1,921,296

UNITED STATES PATENT OFFICE 1,921,296

FILTER

Andrew M. Harkness, Nyack, N. Y., assignor to General Chemical Company, New York, N. Y., a Corporation of New York Application September 22, 1932
Serial No. 634,301

11 Claims. (Cl. 210—69)

This invention relates to filters, and is more particularly directed to improvements designed to eliminate, in the operation of a known type of continuous filter, difficulties which result in the necessity of frequent replacement of the driving gears.

Filters of the type to which the present invention relates usually comprise a rapidly rotating, horizontally disposed filter basket having therein a rotatable conveyor which is rotated at a rate slightly in excess of that of the filter basket so as to cause the salt or solid particles being deliquored to be moved over the filter surface from the inlet to the discharge end of the filter chamber. The filter basket and the conveyor therein are both, as a rule, driven by a single main shaft which is connected at one end to a suitable source of power, and at the opposite end, attached directly to the conveyor. The basket, however, is driven from the main shaft through a set of timing gears which maintain relatively different rates of rotation between the conveyor and the basket, so that the basket is rotated at a rate slightly less than that of the conveyor. The conveying element and the face of the filtering surface are adjacent each other, and when filtering some salts or solid materials, for example those having a tendency to pack, a tremendous friction is developed between the conveyor, the salt and the filtering surface with the result that a clutching effect is created which acts to cause the more slowly moving filter basket to be driven by the conveyor rather than by the basket driving gears. While in operation, there is a constant tendency for the conveyor to drive the basket, and where the solids being filtered readily pack, the friction created between the conveyor and the basket, in conjunction with the small differential between the rates of rotation of the basket and the conveyor give rise to a very high torque in the gears. This torque is so great as to produce a terrific strain and effect exceedingly rapid wear on the teeth of the reduction gears with consequent frequent breakage of gears and sometimes of the gear housings themselves.

It is the primary object of the present invention to eliminate breakage of the reduction gears with the attendant expense for replacements and interruption of production. Briefly considered, the invention comprises the application of a brake or a power absorbing unit, connected to the basket of the filter between the filtering surface and the driving gears thereof, so as to partially, or to any desired degree, absorb and prevent transmission to the basket driving gears of frictional clutching effects developed between the filtering surface, the salts thereon and the conveyor, and thus eliminate or reduce to a large extent the great strain on the reduction gears arising from the friction created between the filtering surface and the conveyor. More specifically, the invention is concerned with improvements relating to mechanism for controlling the action of the brake or power absorbing unit.

The invention is of such nature that the objects, advantages and features of novelty thereof may be more fully understood from a consideration of the following description taken in connection with the accompanying drawing in which,—

Figure 1:
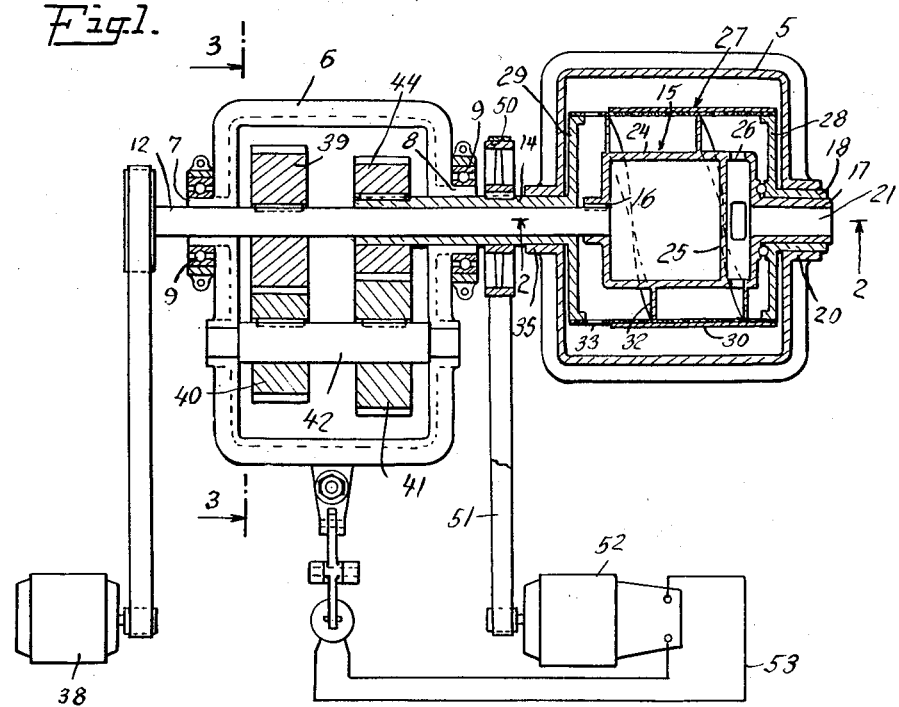
Fig. 1 illustrates, in horizontal section, filtering elements and driving gears of a centrifugal filter, and shows diagrammatically a brake or power absorbing unit and associated control means for accomplishing the objects of the invention.
Figure 2:
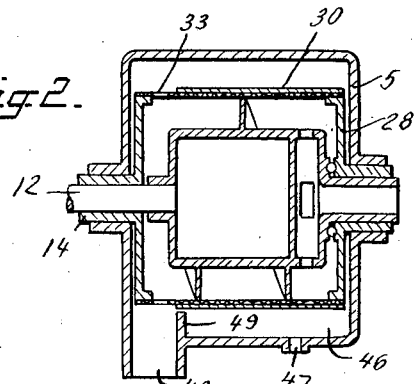
Fig. 2 is a vertical section on the line 2—2 of Fig. 1.

Centrifugal filters of the general type to which the present invention is applicable are well known in the art, and only so much of such construction is shown in the drawing as is necessary for an appreciation of the invention. It will be understood that the filter chamber casing 5 is one section of a frame for supporting and maintaining the filtering units of the apparatus in position. The driving gear housing 6 has projecting from either side sleeves 7 and 8 journalled in bearings 9 carried on the upper ends of stationary supports 10 one of which is shown in elevation in Fig. 3.

The main or conveyor shaft 12 is journalled at one end in the sleeve 7 of gear housing 6, and at an intermediate point in the tubular filter basket sleeve 14. The right end of the solid section of the conveyor shaft fits into and is keyed to a conveyor drum 15 as indicated at 16. The opposite end of drum 15 is formed to provide a tubular section 17 which is in effect an extension and a part of the conveyor shaft 12. The extension 17 is journalled in a sleeve 18 which in turn is rotatably mounted in the filter casing 5 as at 20. The main exterior bearings for the left end of the shaft 12 and for the right end of the tubular section 17 and sleeve 18 are not shown.

The axial opening 21 in extension 17 constitutes an inlet passage through which salt solutions, sludges or any mixtures to be filtered are fed into the interior of the conveyor drum 15, the feed connections at the right end of the apparatus through which the material is introduced not being shown. The cylindrical wall 24 of the conveyor drum is provided between the partition 25 and inlet 21 with a series of openings 26 through which the slurry passes from the interior of conveyor drum 24 into the annular chamber between the exterior of the conveyor drum and the interior of the rotatable filter basket indicated generally by the reference numeral 27.

The filter basket comprises circular end plates 28 and 29 with a cylindrical perforated filtering surface 30 suitably attached at the ends thereof to the peripheries of plates 28 and 29. Secured to the cylindrical exterior of the conveyor drum 15 is a helical screw conveyor 32 which serves, when the apparatus is in operation, to cause salt to move over the filtering surface 30 from the inlet end of the filter chamber to a series of openings 33 in the filtering surface 30 immediately adjacent end plate 29.

The filter basket sleeve 14 is integral with or keyed to the filter basket end plate 29 and is journalled in the filter casing 5, as at 35, and also in sleeve 8 of the gear housing 6. It will be understood that the construction of the basket 27 is such as to provide a strong, rigid cylinder having a perforated filtering surface 30, the filter basket itself being rotated through the sleeve shaft 14.

The conveyor 32 is rotated by shaft 12 which may be belt driven by a motor 38. Motion is transmitted to the filter basket 27 through gear 39 keyed to shaft 12, gears 40 and 41 keyed to the jack shaft 42, suitably journalled in the gear housing 6, and through the gear 44 keyed to the shaft 14 and meshing with gear 41.

The ratios of the gears in the gear casing 6 are such that the conveyor is rotated at a speed slightly greater than that of the basket 27, so that salt deposited on the interior face of the filtering surface 30 is slowly moved over such surface from the right end of the filter chamber to the outlet 33 adjacent the end plate 29. In practice, the speed of rotation of the conveyor may, for example, be in the neighborhood of 750 revolutions per minute, and the gear ratios in the gear casing 6 are chosen so that basket 27 rotates at a rate of about say 6 to 16 revolutions per minute less than that of the conveyor.

The normal operation of the filter as thus far described, and in accordance with the prior practice, is as follows: When the motor is started up, the conveyor drum and the conveyor screw 32 are rotated at about 750 revolutions per minute, and the basket 27 is driven through the gears in housing 6 at a somewhat slower rate as above noted. The salt solutions or slurries to be filtered are fed into the interior of the conveyor drum 15 through the inlet 21. The slurry immediately passes through the several openings 26 in the cylindrical surface of the drum 15 into the interior of the filter basket 27, and is thence thrown by centrifugal force against the inner face of the filtering surface 30. As is usual, the liquid separates and passes through the perforated filtering surface into the interior of the casing 5. The liquids collect in the bottom of the casing in space 46, and are withdrawn therefrom through the liquor outlet 47. As the screw 32 rotates at a rate slightly faster than that of the rotating basket 27, solids collecting on the inner face of the filtering surface 30 are gradually worked toward the left end of the basket, and are discharged from the basket through the openings 33, and from the casing through the salt outlet 48. Separation of the liquor in the space 46 and the salt passing from the casing 5 through the outlet 48 is maintained by the vertically extending partition 49.

It will be seen that when the conveyor and the filter basket are rotating and no salt is being filtered, the conveyor and the filter basket are both driven elements, the conveyor being driven directly by the main shaft 12, and the basket being driven at a slightly slower rate through the main shaft 12, the sleeve shaft 14 and the interposed gears in the gear housing 6. However, when filtering materials particularly salts which, when wet or moist, tend to pack the following conditions arise. The conveyor must necessarily be rotated slightly faster than the filter basket in order to effect discharge of the filtered salt. When the space between the exterior of the conveyor drum 15 and the inner face of the filtering surface 30 is partially filled with salt or solid material, a great amount of friction is developed between the screw, the salt and the filtering surface. The friction thus developed is sufficient to create a clutching effect between the conveyor and the filter basket with the result that the conveyor, revolving faster than the conveyor basket, tends to drive the filter basket. At the instant this clutching effect takes place, the filter basket 27, sleeve shaft 14 and the gears 39, 40, 41 and 44 are immediately transformed from driving members to driven members. Hence, the gears instead of acting to drive the filter basket 27 are themselves driven through the conveyor and filter basket, and consequently must act as brakes to overcome the clutching effect arising from the friction developed between the screw, the salt being filtered, and the inner face of the filter basket 27. Because of this friction and the small differential between the rates of rotation of the basket and the conveyor, the strain set up in the teeth of the gears is so great as to be dangerously near the shearing value. The gears in the casing 6 are large and expensive, and under some operating conditions, for example where trisodium phosphate salt solutions are being deliquored, the wear on the gears 39, 40, 41 and 44 is so great that replacement is frequently required every few months. The difficulties encountered because of the conditions existing within the filter chamber have been heretofore fully recognized as present, but have been considered from the viewpoint of a gear problem, and attempts have been made to overcome the difficulties by specially designed and hardened gears. Such attempts have been entirely unsuccessful, and according to the present invention, the problem is approached from a totally different angle.

According to the invention this constant breakage of gears, and some times of the gear housings, is overcome by the application of a frictional load applied to the sleeve shaft 14 of the filter basket which load acts to retard the rotation of the filter basket and absorb some of the torque set up by the clutching effect between the conveyor and filter basket, thus relieving the gears in the gear housing of at least part of the tremendous strain to which they are ordinarily subjected.

The objects and purposes of the invention may be carried into effect by the use of several mechanical appliances, one specific embodiment being illustrated in the accompanying drawing. A pulley 50, keyed to the sleeve shaft 14 between the filter casing 5 and the gear housing 6, is connected through a belt 51 to the shaft of a generator 52. Output circuit 53 of the generator has therein a resistance unit indicated generally by reference numeral 54, which unit in the present embodiment of the invention is a carbon pile. This unit may be of conventional construction and may include a plurality of oppositely dished discs 55 forming receptacles for carbon, through which discs passes a vertically movable rod 56 having on its lower end a nut 57 for supporting the discs and the carbon. The top of rod 56 is connected to a lever 58 pivoted on support 60 at 62.

As heretofore observed, the gear housing 6 is rotatably supported by sleeves 7 and 8 resting in bearings 9. It will be seen that the gear housing 6 is therefore free to rotate about the conveyor shaft 12. Projecting forwardly from flanges 65 of the housing 6 is an arm 67 slotted to slidably receive a vertically disposed rod 68 supported in a bearing 69, arranged to permit slight movement of the top of rod 68 toward and away from gear casing 6. Threaded onto rod 68 are nuts 71 and 72 compressing springs 73 and 74, encircling rod 68, against the under and upper faces of arm 67. The tension of springs 73 and 74 may be adjusted by axial movement of nuts 71 and 72.

The arm 67 carries on its outer end a horizontal pin 75 projecting through an elongated slot 76 in the adjacent end of arm 58.

Figure 3:
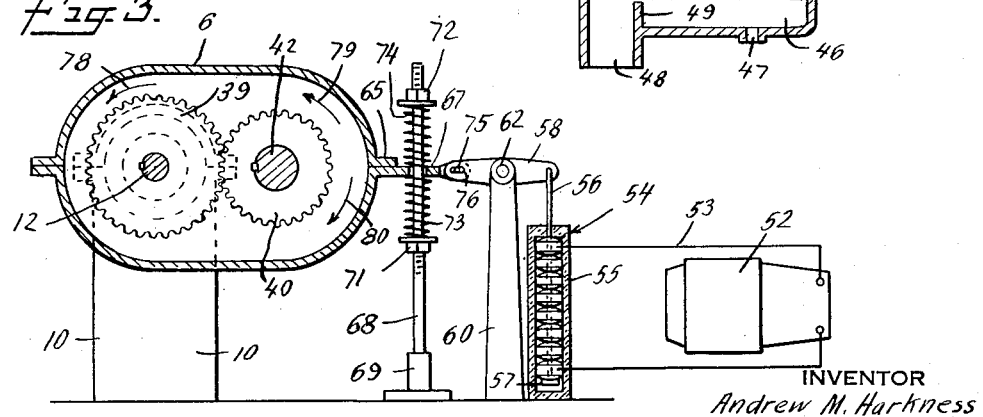
Fig. 3 is a transverse vertical section on the line 3—3 of Fig. 1 showing diagrammatically the power absorbing units and the control means therefor.

From the foregoing description of the mounting of the housing 6 and the contained timing gears, it will be seen that the jack shaft 42 is in effect a floating axis, and, when the filter is at rest, is maintained in the position shown in Fig. 3 by the spring 73 and 74. While in operation, shaft 12, the conveyor 32 and the filter basket 27 all rotate in the direction of the arrow 78 of Fig. 3, the filter basket being driven at a rate slightly less than that of the conveyor because of the ratio of the gears in housing 6. When the filter is being rotated but no liquor is being filtered, there is no clutching effect between the conveyer 32 and the filter basket 27. If jack shaft 42 were free to rotate about the shaft 12 at an axis, the jack shaft 42, gears 40 and 41 and the housing 6 would tend to rotate about shaft 12 in the direction of the arrow 79 Fig. 3. The tension on spring 74 is so adjusted by nut 72 as to overcome, through arm 67, the tendency of housing 6 to rotate in the direction of arrow 79 about shaft 12 as an axis when the filter is running empty.

As heretofore noted, when filtering, as soon as friction is created between conveyor 32 and the filter basket 27, the conveyor tends to drive the filter basket at a rate approximately the same as that of the conveyor, thus transforming sleeve 14, gears 44, 41 and 40 into driven instead of driving members. As soon as this condition arises, and the conveyor, through basket 27, sleeve 14, gears 44 and 41, tends to drive gear 40 (in the direction of arrow 80, Fig. 3) at an increased rate, gear 40 tends to drive gear 39. However, since the rate of rotation of the latter is relatively constant, gear 40 tends to roll around the face of gear 39 clockwise and at the same time carry jack shaft 42, the gear housing 6 and arm 67 in the direction of the arrow 80, Fig. 3. This tendency of jack shaft 42 to rotate gear housing 6 in the direction of the arrow 80 is directly proportional to the clutching effect created between the conveyor 32 and the inner face of the filter basket 30.

The operation of the filter in accordance with the present invention is as follows: For purposes of illustration, let it be assumed that when the sleeve shaft 14 is not connected to generator 52, and the filter basket is empty, about 20 H. P. is required to rotate the filter basket and the conveyor. Further assume when operating and filtering under normal conditions encountered in the usual practice, the filter basket not being connected to the generator 52 as is the case in the present invention, that about 45 H. P. is required to rotate the filter basket and the conveyor. It will be recalled from the above description that when the conveyor and basket are rotating and operating filter material, the conveyor at all times tends to drive the filter basket 27 through the salt friction between the conveyor and basket. If 20 H. P. is required to turn the filter while empty and 45 H. P. is required to rotate the same when operating under usual conditions encountered in practice, it will be seen that the reaction against the normal following faces of the teeth of the gears in the housing 6 is 25 H. P. The primary purpose of the present invention is to greatly reduce or eliminate such excessive strain on the gears. This object is accomplished by applying to the sleeve shaft 14 a brake which prevents, wholly or partially, the transmission to the timing gears of the full effect of the friction developed between the conveyor and the filtering surface. In the present embodiment of the invention this result is brought about by causing the sleeve shaft 14 to drive the generator 52. It will be seen that whatever energy is required to operate the generator, and is transmitted thereto through the pulley 50 and the belt 51, is thus diverted from and is not transmitted to the gears in the housing 6.

For further purpose of illustration, it may be assumed that the pile 54 is regulated so that when the arm 58 is in the position shown in the drawing, about 5 H. P. is required to operate the generator 52. Nut 71 is so adjusted on rod 68 as to maintain the gear housing 6, arm 67 and lever 58 approximately in the horizontal position shown in Fig. 3 when the filter is being driven at normal speeds but contains no material therein being filtered. Hence, when conditions in the filter are such that the reaction on the following faces of the gears in housing 6 is 25 H. P. as above assumed, and resistance 54 is adjusted so that 5 H. P. is required to operate the generator 52, the net reaction on the following faces of the gears 39, 40, 41 and 44 would be 20 H. P., with the result that the reaction on the gears is reduced by the amount of energy necessary to drive the generator 52.

When filtering, as the load in the filter basket and the friction between the conveyor and the filter basket increases, as heretofore explained, the tendency on the part of the conveyor to drive the basket 27 becomes more pronounced, and at the same time the reaction on the following faces of the gears in the housing 6 proportionally increases. Since when any materially abnormal friction is created between the conveyor and the filter, as previously noted, jack shaft 42 tends to move in the direction of arrow 80 and lower the arm 67 against the resistance of spring 73. As arm 67 is lowered pin 75 drops, and the opposite end of lever 58 is raised, lifting rod 56 and decreasing the resistance in the carbon pile 54. With a decrease of resistance in the outlet circuit 53 of generator 52 more power is required to drive the generator 52. Accordingly, as the friction between conveyor 32 and the filter basket 27 increases, the energy required to drive generator 52 proportionally increases, and the braking effect applied to sleeve shaft 14 by the action of generator 52 is likewise proportionally increased. Hence, the greater the tendency of the conveyor to drive the filter basket, the greater is the braking force applied to sleeve shaft 41 to prevent transmission of the full effect of the back lash to the following faces of the gears in gear housing 6.

Pile 54 may be constructed to provide resistance in the output circuit 53 within any desired range. In the present illustration, assuming that the resistance 54 is so adjusted that when the filter is rotating empty and not filtering, and the parts are approximately in the position shown in Fig. 3, the resistance of rheostat 54 is such as to require 5 H. P. to drive the generator, pile 54 may be so constructed that when the minimum resistance to current flow through circuit 53 is set up, about 15 H. P. is needed to turn over the generator.

Accordingly, whatever may be the amount of the reaction against the gears in the gear housing 6, such reaction may be reduced wholly or partially by the application of sufficient braking power to the sleeve shaft 14. It will be apparent, of course, that by applying braking power to the sleeve shaft 14, more energy is required to drive the filter, and the power cost is increased. Therefore, it is to advantage to apply to the sleeve shaft 14 only so much braking power as is necessary to overcome the greater part of the strain and reaction imposed upon the following faces of the gears in the gear housing. Hence, it is ordinarily desirable to apply to the sleeve shaft 14 only sufficient braking effect as is necesary to reduce the strain on the gears to within reasonably safe limits. Based on the assumption that when the filter is in normal operation in accordance with prior practice and in the absence of the present invention, the reaction of the gears is about 25 H. P., it may be quite sufficient to apply to the sleeve shaft 14 through the generator 52 a braking effect of about 15 H. P., thus reducing the strain on the driving gears about 60%. While, by the present invention, the degree of friction developed between the conveyor and the filter basket is not decreased, the full reaction of this frictional clutching effect is not transmitted to the gears in the housing 6 for the reason that it may be absorbed to any desired extent by the generator 52. While more power is required to operate the filter in accordance with the present invention, the cost of the additional power is entirely offset by the great saving in replacement costs of the driving gears.

Several other forms of brakes may be applied to the filter basket to partially or fully absorb the friction developed between the conveyor and the filtering surface. For example, the pulley 50 may be connected to a rotor of a standard hydraulic dynamometer, and the resistance offered by the dynamometer to the rotation of the sleeve shaft 14 may be regulated by control of the by-pass valves of the dynamometer by suitable links connected to the end of lever 58 remote from pin 75, or to arm 67. Any other form of mechanically controlled rheostat may be substituted for the pile 54 illustrated in the drawing. It may also be feasible in some circumstances to insert a motor in the output circuit 53, and through such motor drive a pump feeding slurry to the filter. In this situation, the output circuit of the generator may be provided with rheostat controlled by movement of the housing 6 for adjusting the braking effect of the generator on the sleeve shaft 14. In this manner, added power cost of operating the system may be offset to some extent by utilizing the energy developed by the generator for pumping slurry into the filter chamber.

It will be understood that the invention is not limited to use in conjunction with the exact type of filter disclosed in the drawing. The invention is equally applicable to a similar apparatus, such for example as where the filter basket or filter surface is driven at a slightly greater rate than the conveyor, in which case it is only necessary in order to accomplish the purposes of the invention to apply braking power to the more slowly moving element, i. e. in the situation supposed, to the conveyor.

In the appended claims, the term "salt" is intended to designate any filterable material.

I claim:

1. In an apparatus having a pair of movable elements operating under conditions tending to develop friction between the two elements, the combination of means for driving each of said elements, one of said driving means including a bodily movable member, the means driving one of said elements being constructed and arranged to drive its associated element at a rate slower than the other element is driven by its driving means whereby friction developed between the two elements tends to move the two elements in unison, and means controlled by bodily movement of said member for preventing the transmission to the driving means of the more slowly driven element of at least some of the frictional clutching effect developed between the two elements as tend to transform the driving means of the more slowly driven element from a driving member to a driven member.

2. In an apparatus having a pair of movable elements operating under conditions tending to develop friction between the two elements, the combination of means for driving each of said elements, the means driving one of said elements being constructed and arranged to drive its associated element at a rate slower than the other element is driven by its driving means whereby friction developed between the two elements tends to move the two elements in unison, a bodily movable member associated with the driving means of the more slowly driven element, and means controlled by bodily movement of said member for preventing the transmission to the driving means of the more slowly driven element of at least some of the frictional clutching effect developed between the two elements as tend to transform the driving means of the more slowly driven element from a driving member to a driven member.

3. A filter comprising a pair of elements consisting of a movable filter surface and a conveyor, means for driving the filter surface and means for driving the conveyor, one of said driving means being constructed and arranged so as to drive its associated element at a rate slower than the other element is driven by its driving means whereby salt to be filtered is moved over the filter surface, a bodily movable member associated with the driving means of the more slowly driven element, and means controlled by bodily movement of said member for preventing the transmission to the driving means of the more slowly driven element of at least some of the frictional clutching effects developed between the filter surface, the salt thereon and the conveyor as tend to transform the driving means of the more slowly driven element from a driving member to a driven member.

4. A filter comprising a movable filtering surface and means including a bodily movable member for driving said surface, a conveyor for moving salt to be filtered over said filtering surface, means for driving the conveyor, and means controlled by bodily movement of said member for preventing the transmission to the filter surface driving means of at least some of the frictional clutching effects developed between the filtering surface, the salt thereon and the conveyor as tend to transform the filter surface driving means from a driving member to a driven member.

5. A centrifugal filter comprising a rotatable filter basket and means for rotating the basket, a rotatable conveyor and means for rotating the conveyor, one of said rotating means including a floating member and being constructed and arranged so as to rotate its associated element at a rate slower than the other element is rotated by its rotating means whereby salt to be filtered is moved over the filter surface, and means controlled by movement of the floating member for preventing the transmission to the rotating means of the more slowly rotated element of at least some of the frictional clutching effects developed between the filter surface, the salt thereon and the conveyor as tend to transform the rotating means of the more slowly rotated element from a driving member to a driven member.

6. A centrifugal filter comprising a rotatable filter basket and means for rotating the basket, a rotatable conveyor and means for rotating the conveyor, one of said rotating means including a floating member and being constructed and arranged so as to rotate its associated element at a rate slower than the other element is rotated by its rotating means whereby salt to be filtered is moved over the filter surface, and means controlled by movement of the floating member and associated with the more slowly rotated element for preventing the transmission to its rotating means of at least some of the frictional clutching effects developed between the filter surface, the salt thereon and the conveyor as tend to transform the rotating means of the more slowly rotated element from a driving member to a driven member.

7. A filter comprising a movable filtering surface and means including a floating gear for driving said surface, a conveyor for moving salt to be filtered over said filtering surface, means for driving said conveyor, and means comprising a brake controlled by movement of the floating gear and operatively associated with the filter surface for preventing the transmission to the filter surface driving means of at least some of the frictional clutching effects developed between the filtering surface, the salt thereon and the conveyor as tend to transform the filter surface driving means from a driving member to a driven member.

8. A filter comprising a pair of elements consisting of a movable filter surface and a conveyor, means for driving the filter surface and means for driving the conveyor, one of said driving means including a floating member and being constructed and arranged so as to drive its associated element at a rate slower than the other element is driven by its driving means whereby salt to be filtered is moved over said filter surface, and a brake controlled by movement of the floating member and operatively associated with the more slowly driven element for preventing the transmission to its driving means of at least some of the frictional clutching effects developed between the filter surface, the salt thereon and the conveyor as tend to transform the driving means of the more slowly driven element from a driving member to a driven member, and means for applying the brake substantially proportionally to the degree of friction developed between the conveyor, the salt and the filter surface.

9. A centrifugal filter comprising a rotatable filter basket and means including a floating gear for rotating the basket, a conveyor in the basket and means for driving the conveyor at a rate greater than that at which the filter basket is driven so as to effect relative movement between the filter surface of the filter basket and the conveyor whereby salt to be filtered is moved over the filter surface of the filter basket, and a brake connected with the basket and controlled by movement of the floating gear for preventing transmission to the basket rotating means of at least some of the frictional clutching effects developed between the filter surface of the basket, the salt thereon and the conveyor as tend to transform the basket rotating means from a driving member to a driven member.

10. A centrifugal filter comprising a rotatable filter basket having a filter surface, a conveyor in the basket, a shaft for rotating the conveyor, means including reduction gears connected to said shaft for rotating the filter basket at a rate less than that at which the conveyor is rotated so as to effect relative movement between the filter surface and the conveyor whereby salt to be filtered is moved over the filter surface, a housing rotatable about the shaft and having said reduction gears mounted therein, certain of the gears being bodily movable about the shaft and adapted on development of friction between the conveyor and the filter surface to move the housing about the shaft, a brake connected with the basket and controlled by movement of the housing for preventing transmission to the basket rotating means of at least some of the frictional effects developed between the filter surface, the salt thereon and the conveyor as tend to transform the basket rotating means from a driving member to a driven member, and means for applying the brake to the basket substantially proportionally to the degree of friction developed between the conveyor and the filter surface.

11. A centrifugal filter comprising a rotatable filter basket having a filter surface, a conveyor in the basket, a shaft for rotating the conveyor, means including reduction gears connected to the shaft for rotating said filter basket at a rate less than that at which the conveyor is rotated so as to effect relative movement between the filter surface and the conveyor whereby salt to be filtered is moved over the filter surface, a housing rotatable about the shaft and having the reduction gears mounted therein, certain of said gears being bodily movable about the shaft and adapted on development of friction between the conveyor and the filter surface to move the housing about the shaft, a generator connected to the basket between the filter surface and the basket driving reduction gears, an output circuit for the generator having a resistance therein, means actuated by the movement of the housing for regulating the resistance to control the retarding influence of the generator on the basket substantially proportionally to the friction developed between the filter surface and the conveyor.

ANDREW M. HARKNESS.